(12) United States Patent
Gostev et al.

(10) Patent No.: US 10,007,447 B2
(45) Date of Patent: Jun. 26, 2018

(54) SYSTEMS, METHODS, AND COMPUTER PROGRAM PRODUCTS FOR LOW IMPACT BACKUP

(71) Applicant: Veeam Software AG, Baar (CH)

(72) Inventors: Anton Gostev, Saint-Petersburg (RU); Alexander Baranov, Saint-Petersburg (RU)

(73) Assignee: Veeam Software AG, Baar (CH)

( * ) Notice: Subject to any disclaimer, the term of this patent is extended or adjusted under 35 U.S.C. 154(b) by 0 days. days.

(21) Appl. No.: 14/824,721

(22) Filed: Aug. 12, 2015

(65) Prior Publication Data
US 2016/0048350 A1 Feb. 18, 2016

Related U.S. Application Data

(60) Provisional application No. 62/037,376, filed on Aug. 14, 2014.

(51) Int. Cl.
*G06F 3/06* (2006.01)
*G06F 11/14* (2006.01)
*G06F 11/34* (2006.01)

(52) U.S. Cl.
CPC .......... *G06F 3/0619* (2013.01); *G06F 3/065* (2013.01); *G06F 3/067* (2013.01); *G06F 3/0665* (2013.01); *G06F 11/1461* (2013.01); *G06F 11/1464* (2013.01); *G06F 11/3409* (2013.01); *G06F 11/3485* (2013.01); *G06F 11/1466* (2013.01); *G06F 2201/81* (2013.01); *G06F 2201/815* (2013.01)

(58) Field of Classification Search
CPC ........ G06F 3/067; G06F 3/065; G06F 3/0619; G06F 9/45533; G06F 3/0665; G06F 11/1461; G06F 11/1464; G06F 11/3485; G06F 11/3409
USPC ......................................................... 711/162
See application file for complete search history.

(56) References Cited

U.S. PATENT DOCUMENTS

| 7,139,846 | B1 | 11/2006 | Rossi |
| 8,498,966 | B1 | 7/2013 | Waghole |
| 9,122,503 | B1 * | 9/2015 | Hoff ...................... G06F 21/566 |
| 9,128,629 | B1 * | 9/2015 | Mao ........................ G06F 3/061 |

(Continued)

OTHER PUBLICATIONS

International Search Report and Written Opinion dated Nov. 23, 2015 directed to related International Application No. PCT/IB2015/056151, filed Aug. 12, 2015; 12 pages.

*Primary Examiner* — Jasmine Song
(74) *Attorney, Agent, or Firm* — Sterne, Kessler, Goldstein & Fox, PLLC (57) ABSTRACT

Embodiments include methods, systems, and computer program products for low impact image level backup and replication of data between a production data storage and a backup data storage. In an embodiment system, the system starts processing of a task to backup or recover data between the production data storage and the backup data storage. The system measures a latency to access the production data storage. The system then determines whether the latency is above a throttling threshold. When the system determines that the latency exceeds the throttling threshold, the system calculates a throttling value, determines an amount of the delay based on the calculated throttling value, and delays, by the determined amount, the processing of the next data block.

25 Claims, 5 Drawing Sheets

(56) References Cited

U.S. PATENT DOCUMENTS

2009/0327481 A1 12/2009 Rickard et al.
2014/0092757 A1 4/2014 Xu et al.

* cited by examiner

SYSTEMS, METHODS, AND COMPUTER PROGRAM PRODUCTS FOR LOW IMPACT BACKUP

CROSS-REFERENCE TO RELATED APPLICATIONS

This application is a U.S. Nonprovisional Application which claims the benefit of U.S. Provisional Application No. 62/037,376 filed on Aug. 14, 2014, which is incorporated herein by reference in its entirety.

FIELD OF THE INVENTION

The present invention is related to data backup and recovery. In particular, the present invention relates to methods, systems, and computer program products for image level backup and replication.

BACKGROUND OF THE INVENTION

The impact from image-level backup activities has been a consistent concern for backup administrators. Image-level backup is unique in the way that it deals with very large amounts of data, and this data needs to be read from production storage. Just as any other I/O operation, backup takes I/O resources from production storage. If the production storage is already overprovisioned in terms of IOPS, backup can directly impact availability of mission-critical applications and servers. This presents backup administrators with the challenge of meeting Service Level Agreement levels (SLAs).

Another challenge backup administrators are facing is meeting backup windows. To reduce the time it takes for the whole environment to be backed up, many administrators employ parallel processing—running multiple backups at the same time. Multiple backup processes impact production storage even more, multiplying the I/O impact and related issues accordingly.

Backup administrators struggle finding the required balance between the amount of parallel tasks and storage capacity by manually tweaking backup schedules. However, what works for them today may not necessarily be suitable in 1 month, when additional servers are provisioned, thereby causing additional I/O load on the production storage.

Additionally, even in the carefully planned system, unexpected fluctuation, such as a misbehaving server, may affect the IOPS planning, resulting in the planned and tested amount of parallel backups still taking production storage load beyond acceptable levels.

Therefore, there is a need for an efficient method of automated load balancing of image-level backup activities that would automatically maintain the required backup concurrency and storage load at the maximum acceptable level. The solution should not impact mission-critical applications and servers, and it should allow the backup of the entire environment in the minimum possible time.

SUMMARY OF THE INVENTION

Embodiments of the invention include methods, systems, and computer program products for low impact image level backup and replication of virtual machines. However, it can be used with other backup methods, for example file level or block level backups.

The methods, systems, and computer program products described herein perform low impact image level backup that substantially obviate one or several of the disadvantages of traditional approaches.

Embodiments of the invention include a system for performing image level backup of virtual machine data without impacting production storage beyond acceptable levels. For example, the system can backup multiple virtual machines from the same production storage without exceeding key storage health metrics beyond acceptable levels.

In an embodiment, the low impact backup method does not require performing manual tuning of the amount of concurrent backups, or I/O load from existing backups tasks already initialized.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identities the drawing in which the reference number first appears.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claim(s).

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Unless specifically stated differently, a user, a backup operator, and an administrator are interchangeably used herein to identify a human user, a software agent, or a group of users and/or software agents. Besides a human user who needs to perform image level backups, a software application or agent sometimes needs to perform such tasks. Accordingly, unless specifically stated, the terms "operator," "administrator," and "user" as used herein do not necessarily pertain to a human being.

As used herein, in an embodiment, the term "server" encompasses computing devices that are designed to function as one or more of email servers, Domain Name System (DNS) servers, Domain Controller (DC) servers, application servers, database servers, web servers, firewall servers, and other enterprise servers, file servers, back end servers, and regular desktops. A server may be comprised of one or more server machines. A server may be implemented as a collection of servers such as a server farm or server cluster. For example, web servers may be commercially available server machines with one or more central processing units (CPUs). Alternatively, these web servers may comprise multiple computing devices and/or computing functionality hosted on multiple server machines (i.e., a server farm).

The present invention relates to improved systems, methods, and computer program products for low impact backup.

In this description, a "task" is any activity related to backup, recovery, or associated auxiliary tasks. For example, reading the content of one given volume of the processed computer, such as a virtual disk file of a virtual machine, during backup is considered a task. Another example is writing the content inside of one given volume of the processed computer during recovery. Another example is removing (committing) a VMware snapshot file into the base file when finalizing backup process.

Since every computer volume can be stored on a separate storage device, latency on each such storage device (or Logical Unit (LUN) within the device) must be controlled separately. For simplicity, this application discloses an algorithm as if the environment only has a single production storage device or LUN. However, backup applications implementing this logic may apply the algorithm to every production storage device or LUN.

According to some approaches, an image-level backup may be used to backup a physical or virtual machine (VM). This description will use a virtual machine as a non-limiting example. However, as would be understood by a person of skill in the art, embodiments are not limited to the use with virtual machines and may also be used with physical machines, for example. In the case of a VM, image-level backup may be accomplished by using a hypervisor snapshot (VM snapshot) of the VM. The VM snapshot may be used to create a complete copy of a VM image for backup purposes.

Figure 1:
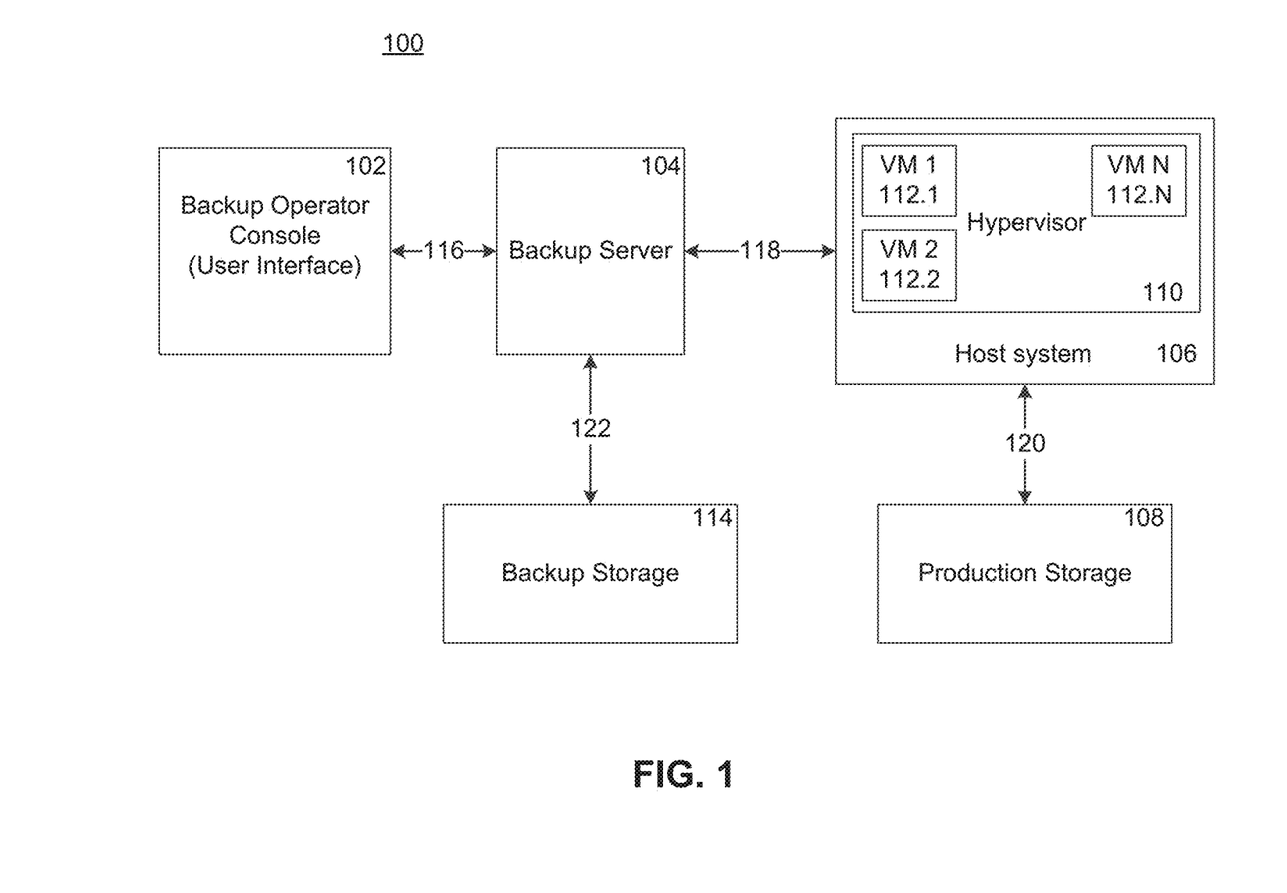
FIG. 1 illustrates an example environment in which embodiments can be practiced or implemented.

FIG. 1 illustrates an example environment 100 in which embodiments can be practiced or implemented. Example environment 100 is provided for the purpose of illustration only and is not limiting of embodiments. As shown in FIG. 1, example environment 100 includes a backup operator console 102, a backup server 104, a host system 106, a production storage 108, and a backup storage 114. Backup server 104 is connected to backup operator console 102 via an interface 116 and to backup storage 114 via interface 122. Host system 106 is connected to backup server 104 via an interface 118 and to production storage 108 via an interface 120.

A backup operator console 102 can include a user interface, through which a backup operator can set certain thresholds. In an embodiment, the thresholds relate to two production storage latency values. In an embodiment, a first threshold value (referred further as "threshold 1") controls an active tasks assignment process and the second threshold value (referred further as "threshold 2") manages a backup I/O throttling process. A backup operator will generally select threshold values that are specific to his or her environment. One goal, for example, might be to minimize the impact of backup operations on the availability of mission-critical applications and servers. Another goal might include satisfying SLAs.

Backup server 104 is a physical or virtual machine that performs the role of a configuration and control center, performing various types of administrative activities (such as coordinating backups, replication tasks, controlling backup scheduling and resource allocating). Backup server 104 processes and writes data to backup storage 114.

Host system 106 can be a server that enables various services and applications. In an embodiment, host system 106 includes a hypervisor 110, which enables a plurality of virtual machines 112.1, 112.2, . . . , 112.N. In an embodiment, hypervisor 110 includes a virtual machine monitor configured to launch and run virtual machines. Hypervisor 110 can be implemented in software, hardware, and/or firmware. For example, hypervisor 110 can be a VMware® vSphere hypervisor or Microsoft® Hyper-V hypervisor.

According to an example embodiment, FIG. 1 illustrates a backup operator console 102, which can include a user interface to be used to initiate image level backup of one or more Virtual Machines 112.1, 112., . . . , 112.N enabled on Hypervisor 110. Initiation of backup process can be received by backup server 104. The backup server 104 can establish a connection with hypervisor 110 enabled on host system 106 and initiate image level backup of one or more Virtual Machines 112.1, 112.2, . . . , 112.N.

Once the backup process is initiated, backup server 104 can start to add tasks. As explained above, a "task" is any activity related to backup, recovery, or associated auxiliary tasks. The backup server 104 then checks whether a prescribed minimal number of tasks is reached. If a minimal number of tasks has not been reached, the backup server 104 adds another task. In an embodiment, the minimal number of tasks is two. The backup server 104 may wait (further referred to as a "waiting step"), as necessary for the minimal number of tasks to be reached. Next, the backup server 104 measures the latency of production storage 108. In an embodiment, the backup server 104 measures the latency of production storage 108 by communicating with the Hypervisor 110 and issuing Application Programming Interface (API) calls that determine the latency of production storage 108.

Backup server 104 next identifies whether the measured production storage latency is above or below threshold 1. If the measured production storage latency is below threshold 1, backup server 104 checks whether there are more pending tasks present. If there are more pending tasks present, backup server 104 adds a task and proceeds to the waiting step. If there are no more tasks present, backup server 104 checks whether all tasks are completed. The process then ends, if all tasks are completed, or otherwise proceeds to the waiting step.

If the resulting production storage latency is above threshold 1, the backup server 104 then checks whether the measured production storage latency is above or below threshold 2. If the measured production storage latency is below threshold 2, the process proceeds to the waiting step.

If the measured production storage latency is above threshold 2, the backup server 104 calculates a required backup I/O throttling level (further referred to as "throttling calculation step"). In an embodiment, the required backup I/O throttling level is defined as a percent value and calculated the following way. The threshold 2 value is subtracted from the received value of the current latency of the production datastore. The result is a delta value between the maximum desired latency and the actual latency. The delta value is then multiplied by a predefined fine tuning coefficient. The final result defines a percentage by which the backup server 104 will throttle one or more of the running tasks.

If the required backup I/O throttling level is 0% or less, the required backup I/O throttling level is reset by backup server 104, and the process proceeds to the waiting step. If the required backup I/O throttling level exceeds 0%, the backup server 104 is further configured to check whether the required backup I/O throttling level is bigger than a pre-defined maximum value N. If yes, then the backup server 104 applies the maximum throttling level N, waits, measures the production storage latency and returns to the "throttling calculation" step. Otherwise, backup server 104 applies backup I/O throttling according to the calculated value.

The backup server 104 applies backup I/O throttling by slowing down the processing of tasks by adding delays (alternatively called a "sleep"). The amount of the delay is dependent on the calculated backup I/O throttling level. In one embodiment, backup I/O throttling introduces "sleep" time into the tasks to reduce their effective throughput. For example, sleep time may be inserted between data mover processes within a task so that the process of reading subsequent data blocks in a file is delayed in accordance with the calculated backup I/O throttling level. If for example, the backup I/O throttling level is 0%, then no sleep time will be inserted (i.e. there is no throttling). If the backup I/O throttling level is 90%, then the backup server 104 will insert enough sleep time to throttle back the processing throughput of the task by 90%.

After applying backup I/O throttling, backup server 104 waits and checks whether one of the running tasks is completed. If one of the running tasks is completed, backup server 104 then resets the backup I/O throttling level. Otherwise, backup server 104 measures production storage latency and proceeds to the throttling calculation step.

Figure 2A:
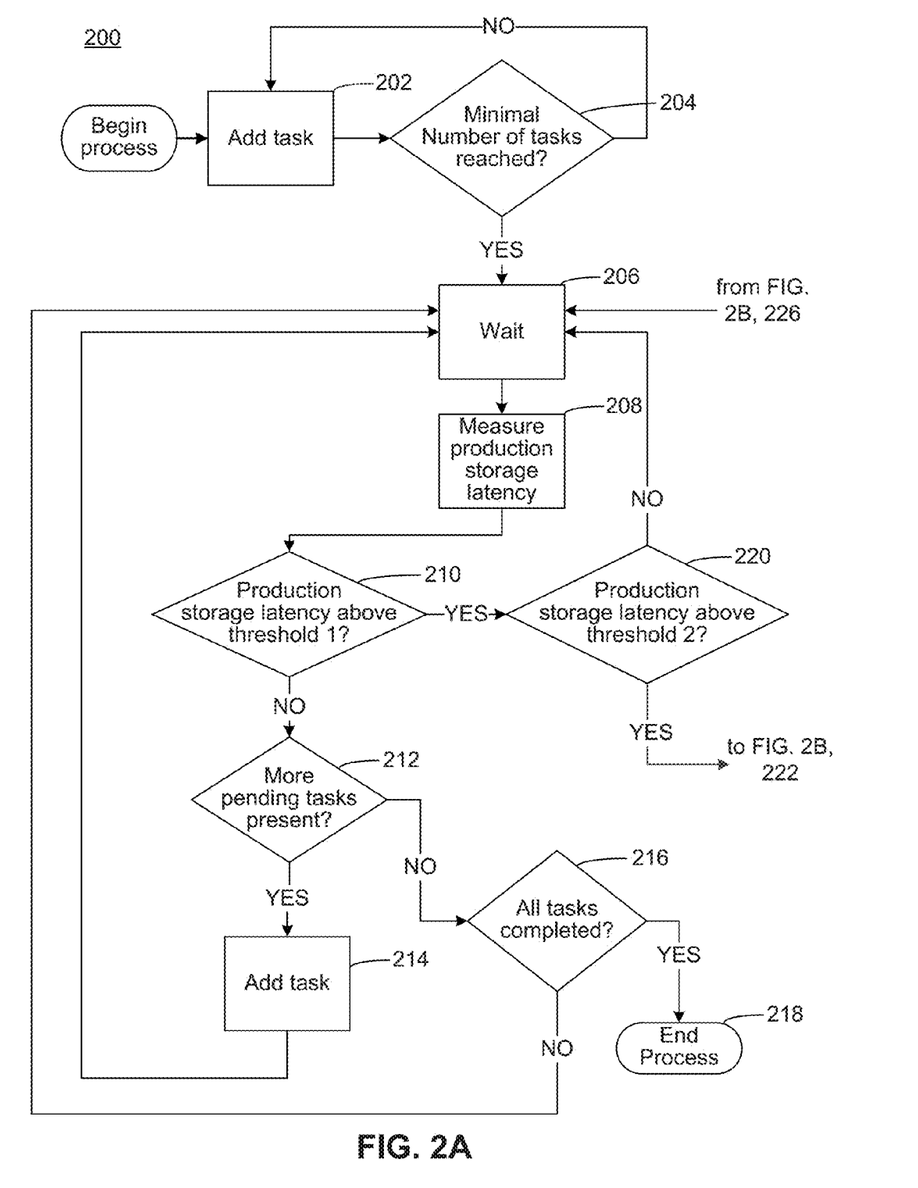
FIGS. 2A and 2B illustrate operation of an example system according to an embodiment.
Figure 2B:
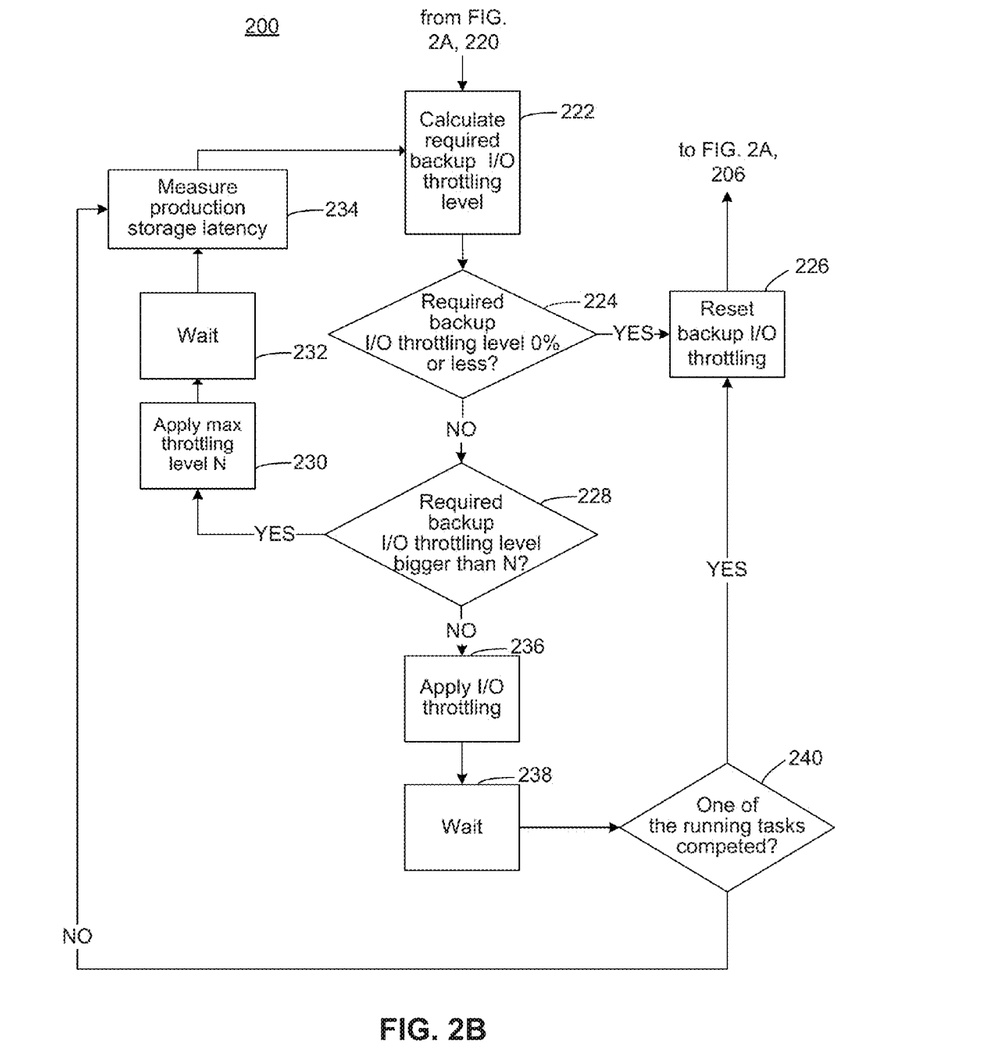

FIGS. 2A and 2B illustrate an example process 200 according to an embodiment. Example process 200 is provided for the purpose of illustration only and is not limiting of embodiments. Example process 200 can be performed by a backup server, such as backup server 104.

As shown in FIG. 2A, example process 200 begins in step 202, which includes adding tasks. Subsequently, example process 200 proceeds to step 204, which includes determining whether the minimal number of tasks is reached. In an embodiment, the minimal number of tasks is two.

If the answer is no, the process 200 returns to step 202, which includes adding tasks. Otherwise, process 200 proceeds to step 206.

In step 206, process 200 includes a waiting step, which permits previous steps to complete. The amount of time process 200 spends waiting may be predefined, or it may be dependent upon other factors, such as the performance characteristics of one or more of the components in environment 100.

Subsequently, process 200 proceeds to step 208 which includes measuring production storage latency. Then, process 200 proceeds to step 210, which includes determining whether the measured production storage latency is above threshold 1. If not, the process 200 proceeds to step 212, which includes determining whether there are more pending tasks present. If there are more pending tasks, the process 200 proceeds to step 214, which includes adding, tasks, and then returning to the waiting step 206. Alternatively, if there are no more pending tasks, the process 200 proceeds to step 216, which includes determining whether all tasks are completed. If all tasks are completed, the process 200 ends in step 218. Otherwise, the process 200 returns to the waiting step 206.

If in step 210, the measured production storage latency is above threshold 1, the process 200 proceeds to step 220, which includes determining whether the measured production storage latency is above threshold 2. If the answer is no, the process 200 returns to waiting step 206. Otherwise, process 200 proceeds to step 222, which includes calculating the required backup I/O throttling level.

Subsequently, process 200 proceeds to step 224, which includes determining whether the required backup I/O throttling level is 0% or less. If the answer is yes, the process proceeds to step 226, which includes resetting the backup I/O throttling level and then returning to waiting step 206. Otherwise, process 200 proceeds to step 228, which includes determining whether the required throttling level is bigger than a pre-defined maximum value N. If the answer is yes, the process proceeds to step 230, which includes applying maximum throttling level N, then, to 232, which includes waiting, then to step 234, which includes measuring production storage latency and, finally, to step 222. Otherwise, process 200 proceeds to step 236 which includes applying backup I/O throttling. Process 200 then proceeds to step 238, which includes waiting.

Process 200 next proceeds to step 240, which includes determining whether one of the running tasks is completed. If the answers is yes, the process proceeds to step 226, which includes resetting the backup I/O throttling level and returning to waiting step 206. Otherwise, the process proceeds to step 234, which includes measuring the production storage latency and then returning to step 222.

Figure 3:
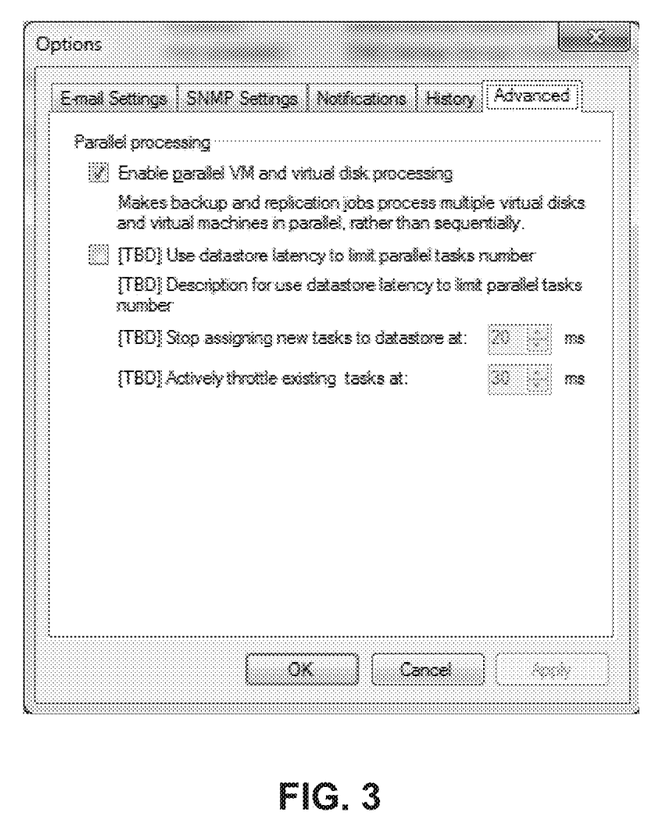
FIG. 3 illustrates an exemplary graphical user interface (GUI), wherein the low impact backup can be configured, in accordance with an embodiment of the invention.

FIG. 3 illustrates an exemplary graphical user interface (GUI), wherein the low impact backup can be configured, in accordance with an embodiment of the invention. In an embodiment, a backup operator may use the GUI of FIG. 3 to select various options. For example, the backup operator may enable or disable parallel VM and virtual disk processing. The backup operator may further enable or disable a feature of the instant invention—particularly, limiting the number of parallel tasks according to the latency of production storage. The backup operator may also use the GUI of FIG. 3 to specify threshold 1 (i.e. the latency at which no new tasks should be assigned to the production storage) and threshold 2 (i.e. the latency at which tasks should be actively throttled).

Figure 4:
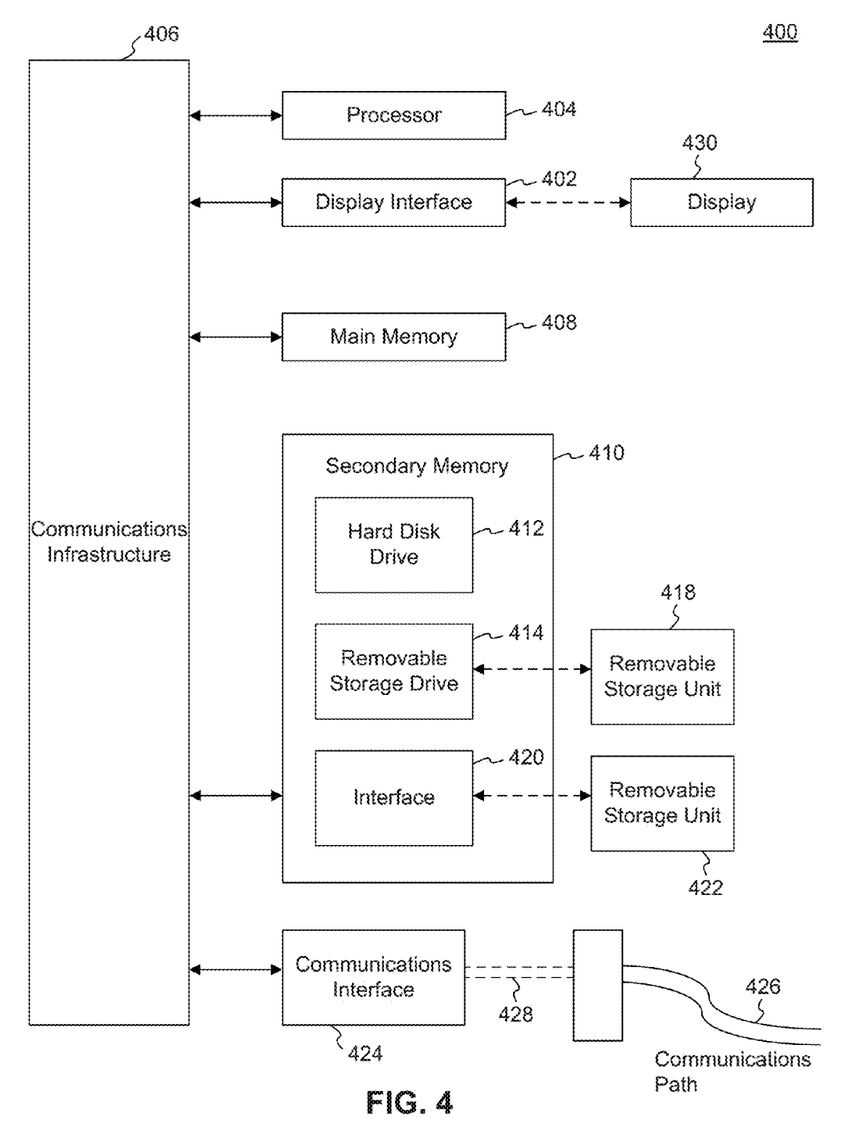
FIG. 4 illustrates an example computer system according to an embodiment.

Various aspects of the present invention can be implemented by software, firmware, hardware, or a combination thereof. FIG. 4 illustrates an example computer system 400 in which the present invention, or portions thereof, can be implemented as computer-readable code. For example, the methods illustrated by the process 200 of FIGS. 2A and 2B can be implemented in system 400. Environment 100 of FIG. 1 can also be implemented in system 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 404. Processor 404 can be a special purpose or a general-purpose processor. Processor 404 is connected to a communication infrastructure 406 (for example, a bus, or network).

Computer system 400 also includes a main memory 408, preferably random access memory (RAM), and may also include a secondary memory 410. Secondary memory 410 may include, for example, a hard disk drive 412, a removable storage drive 414, flash memory, a memory stick, and/or any similar non-volatile storage mechanism. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may comprise a floppy disk, magnetic tape, optical disk, etc. which is read by and written to by removable storage drive 414. As will be appreciated by persons skilled in the relevant art(s), removable storage unit 418 includes a non-transitory computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like.

Computer system 400 may additionally include computer display 430. According to an embodiment, computer display 430, in conjunction with display interface 402, can be used to display the user interface on operator console 102. Computer display 430 may also be used to display the graphical user interface depicted in FIG. 3.

In this document, the terms "computer program medium," "non-transitory computer readable medium," and "computer usable medium" are used to generally refer to media such as removable storage unit 418, removable storage unit 422, and a hard disk installed in hard disk drive 412. Computer program medium, computer readable storage medium, and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor 404 to implement the processes of the present invention, such as the steps in the methods illustrated by process 200 of FIGS. 2A and 2B and environment 100 of FIG. 1 discussed above. Accordingly, such computer programs represent controllers of the computer system 400. Where the invention is implemented using software, the software may be stored in a computer program product and loaded into computer system 400 using removable storage drive 414, interface 420, hard drive 412, or communications interface 424.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A computer implemented method for low impact backup, comprising:
   starting processing of a task to backup or recover data to or from a production data storage;
   measuring a latency to access the production data storage;
   determining the latency is above a throttling threshold;
   calculating a throttling value that defines an amount to throttle the processing of the task to backup or recover data to or from the production data storage;
   determining an amount of delay based on the throttling value;
   inserting sleep time within the task, wherein the sleep time is based at least in part on the determined amount of delay; and
   processing the modified task.

2. The method of claim 1, wherein the determining the amount of delay comprises determining the amount of delay such that the amount of delay allows the processing of the task to be throttled back by a percentage value indicated by the throttling value.

3. The method of claim 1, wherein the calculating comprises:
   subtracting the throttling threshold from the latency to determine a delta value; and
   multiplying the delta value by a predefined fine tuning coefficient to determine the throttling value.

4. The method of claim 1, wherein the measuring comprises communicating with a hypervisor in a host system connected to the production data storage to access a latency value.

5. The method of claim 1, further comprising:
until the latency exceeds a task adding threshold, repeatedly:
waiting for a defined amount of time;
starting processing of additional tasks to backup or recover data between the production data storage and a backup data storage; and
re-measuring the latency.

6. The method of claim 5, further comprising:
receiving the task adding threshold and the throttling threshold from a user configuration.

7. The method of claim 1, the delaying inserting further comprising:
inserting the sleep time between data mover processes within the task.

8. The method of claim 1, further comprising:
setting the throttling threshold based on environmental conditions of a backup data storage.

9. The method of claim 1, wherein the calculating comprises:
calculating the throttling value based at least in part on the measured latency and the throttling threshold.

10. The method of claim 1, further comprising:
in response to the calculating the throttling value, determining the throttling value is above a predefined maximum value; and
setting the throttling value to the predefined maximum value.

11. The method of claim 1, further comprising:
in response to the calculating the throttling value, determining the throttling value is less than or equal to 0%; and
resetting the throttling value.

12. The method of claim 1, further comprising:
determining the latency is above a second threshold value, wherein the second threshold value controls an active task assignment process.

13. The method of claim 1, wherein the sleep time within the task causes processing of the task to be throttled back by the throttling value.

14. A system, comprising:
a memory;
at least one processor coupled to the memory and configured to:
start processing of a task to backup or recover data to or from a production data storage;
measure a latency to access the production data storage;
determine the latency is above a throttling threshold;
calculate a throttling value that defines an amount to throttle the processing of the task to backup or recover data to or from the production data storage;
determine an amount of delay based on the throttling value;
insert sleep time within the task, wherein the sleep time is based at least in part on the determined amount of delay; and
process the modified task.

15. The system of claim 14, wherein to determine the amount of delay, the at least one processor is further configured to:
determine the amount of delay such that the amount of delay allows the processing of the task to be throttled back by a percentage value indicated by the throttling value.

16. The system of claim 14, wherein to calculate the throttling value, the at least one processor is further configured to:
subtract the throttling threshold from the latency to determine a delta value; and
multiply the delta value by a predefined fine tuning coefficient to determine the throttling value.

17. The system of claim 14, wherein to measure the latency, the at least one processor is further configured to:
communicate with a hypervisor in a host system connected to the production data storage to access a latency value.

18. The system of claim 14, wherein the at least one processor is further configured to:
until the latency exceeds a task adding threshold, repeatedly:
wait for a defined amount of time;
start processing of additional tasks to backup or recover data between the production data storage and a backup data storage; and
re-measure the latency.

19. The system of claim 18, wherein the at least one processor is further configured to:
receive the task adding threshold and the throttling threshold from a user configuration.

20. A non-transitory tangible computer-readable medium having instructions stored thereon that, when executed by at least one computing device, cause the at least one computing device to perform operations comprising:
starting processing of a task to backup or recover data to or from a production data storage;
measuring a latency to access the production data storage;
determining the latency is above a throttling threshold;
calculating a throttling value that defines a percentage to throttle the processing of the task to backup or recover data to or from the production data storage;
determining an amount of delay based on the throttling value;
inserting sleep time within the task, wherein the sleep time is based at least in part on the determined amount of delay; and
processing the modified task.

21. The non-transitory computer-readable medium of claim 20, wherein the determining the amount of delay comprises determining the amount of delay such that the amount of delay allows the processing of the task to be throttled back by a percentage value indicated by the throttling value.

22. The non-transitory computer-readable medium of claim 20, wherein the calculating comprises:
subtracting the throttling threshold from the latency to determine a delta value; and
multiplying the delta value by a predefined fine tuning coefficient to determine the throttling value.

23. The non-transitory computer-readable medium of claim 20, wherein the measuring comprises communicating with a hypervisor in a host system connected to the production data storage to access a latency value.

24. The non-transitory computer-readable medium of claim 20, the operations further comprising:
until the latency exceeds a task adding threshold, repeatedly:
waiting for a defined amount of time;

starting processing of additional tasks to backup or recover data between the production data storage and a backup data storage; and re-measuring the latency.

25. The non-transitory computer-readable medium of claim 24, the operations further comprising:

receiving the task adding threshold and the throttling threshold from a user configuration.

* * * * *

UNITED STATES PATENT AND TRADEMARK OFFICE
CERTIFICATE OF CORRECTION

PATENT NO. : 10,007,447 B2  
APPLICATION NO. : 14/824721  
DATED : June 26, 2018  
INVENTOR(S) : Gostev et al.

Page 1 of 1

It is certified that error appears in the above-identified patent and that said Letters Patent is hereby corrected as shown below:

In the Claims

At Column 9, Line 17, please delete "delaying".

Signed and Sealed this  
Fourth Day of June, 2019

Andrei Iancu  
*Director of the United States Patent and Trademark Office*